United States Patent
Shi et al.

(10) Patent No.: US 11,139,754 B1
(45) Date of Patent: Oct. 5, 2021

(54) INVERTER CIRCUIT FOR REALIZING HIGH-EFFICIENCY CONTROL OF SINGLE-PHASE POWER OF SINGLE-PHASE THREE-WIRE POWER SUPPLY

(71) Applicant: Solax Power Network Technology (Zhejiang) Co., LTD., Hangzhou (CN)

(72) Inventors: Xinmiao Shi, Hangzhou (CN); Huawei Guo, Hangzhou (CN); Xiaoyu Sui, Hangzhou (CN); Liangliang Cheng, Hangzhou (CN); Chaohou Liu, Hangzhou (CN); Weixu Chen, Hangzhou (CN)

(73) Assignee: Solax Power Network Technology (Zhejiang) Co., LTD., Hangzhou (CN)

( * ) Notice: Subject to any disclaimer, the term of this patent is extended or adjusted under 35 U.S.C. 154(b) by 0 days.

(21) Appl. No.: 17/303,703

(22) Filed: Jun. 4, 2021

Related U.S. Application Data

(63) Continuation of application No. PCT/CN2021/075046, filed on Feb. 3, 2021.

(30) Foreign Application Priority Data

Oct. 9, 2020 (CN) .......................... 202011070715.6

(51) Int. Cl.
*H02M 7/5387* (2007.01)
*H02M 1/00* (2006.01)

(52) U.S. Cl.
CPC ..... *H02M 7/53871* (2013.01); *H02M 1/0054* (2021.05)

(58) Field of Classification Search
CPC ... H02M 7/53871; H02M 7/48; H02M 1/0054
See application file for complete search history.

(56) References Cited

U.S. PATENT DOCUMENTS

2002/0159281 A1* 10/2002 Furukawa ........... H02M 7/5387
363/132
2002/0172062 A1* 11/2002 Furukawa ............. B60L 15/025
363/132

(Continued)

FOREIGN PATENT DOCUMENTS

CN  1981426 A  6/2007
CN  202513843 U  10/2012

OTHER PUBLICATIONS

"Chinese Application No. 202011070715.6, Notice of granting invention patent right dated Dec. 10, 2020", (dated Dec. 10, 2020), 2 pgs.

(Continued)

*Primary Examiner* — Yusef A Ahmed
(74) *Attorney, Agent, or Firm* — Schwegman Lundberg & Woessner, P.A.

(57) ABSTRACT

An inverter circuit for realizing high-efficiency control of single-phase power of a single-phase three-wire power supply includes a bridge inverter circuit connected to an output end of a DC power supply, a freewheeling circuit connected to an output end of the bridge inverter circuit for providing freewheeling during switching of the bridge inverter circuit, and a control unit connected with the bridge inverter circuit and the freewheeling circuit. When the switching units in the high-frequency operating state are switched to an off state, the freewheeling circuit is controlled to operate continuously to output power to the U-phase line or the W-phase line, so that the switching units only participate in high-frequency operations in nearly half of the whole mains cycle, thereby switching loss and conduction loss of the switching units Q1 to Q6 can be reduced by nearly half, and the efficiency of the whole inverter circuit is greatly improved.

12 Claims, 15 Drawing Sheets

(56) References Cited

U.S. PATENT DOCUMENTS

| | | | |
|---|---|---|---|
| 2014/0002104 A1* | 1/2014 | Yang | G01R 31/42 |
| | | | 324/548 |
| 2016/0111971 A1* | 4/2016 | Rayner | H02M 3/1584 |
| | | | 307/52 |
| 2016/0322916 A1* | 11/2016 | Hao | H02M 7/48 |
| 2018/0309383 A1* | 10/2018 | Wang | H02M 7/5387 |
| 2019/0006957 A1* | 1/2019 | Ito | H02M 7/483 |
| 2019/0238062 A1* | 8/2019 | Lu | H03K 17/122 |
| 2019/0280615 A1* | 9/2019 | Ng | H02M 7/487 |
| 2020/0204101 A1* | 6/2020 | Tokuda | F25B 1/00 |
| 2020/0321796 A1* | 10/2020 | Chang | H02J 7/1438 |
| 2020/0321878 A1* | 10/2020 | Zhang | H02M 7/4837 |

OTHER PUBLICATIONS

"Chinese Application No. 202011070715.6, Notice of the First Examination Opinion dated Nov. 23, 2020", (dated Nov. 23, 2020), 10 pgs.

* cited by examiner

INVERTER CIRCUIT FOR REALIZING HIGH-EFFICIENCY CONTROL OF SINGLE-PHASE POWER OF SINGLE-PHASE THREE-WIRE POWER SUPPLY

CROSS-REFERENCE TO RELATED APPLICATIONS

This application is a continuation of International Application No. PCT/CN2021/075046 filed Feb. 3, 2021, which claims the benefit of priority to Chinese Application No. 202011070715.6, filed Oct. 9, 2020, the benefit of priority of each of which is claimed herein and which applications are hereby incorporated by reference herein in their entirety.

TECHNICAL FIELD

The disclosure relates to the field of electric power, in particular to an inverter circuit for realizing high-efficiency control of single-phase power of a single-phase three-wire power supply.

BACKGROUND ART

A Single-phase three-wire power grid, such as that in Japan, is of U, N and W phases. The U and W phases are for a live wire and the N phase is for a neutral wire. In many occasions, a zero power export to grid is required, that is, there's neither U-phase output power nor W-phase output power to a grid connected terminal. In this case, it is required that the inverter output must be able to be controlled for the output power of U phase and W phase respectively.

An existing main inverter topology is shown in FIG. 1, in which a bridge inverter circuit is composed of switching units Q1 to Q6, C1 represents a bus capacitor, V1 represents a DC power supply, V2 represents an AC split-phase power supply, a filter circuit is composed of inductors L1 to L3 and capacitors C2 and C3, resistors R1 and R2 are loads, and points marked by U, N and W are grid interconnection points. It is required for output power of the bridge inverter circuit, the U-phase output power is equal to load R1 power and the W-phase output power is equal to load R2 power, so as to realize zero power export and zero power consumption of the power grid. The current topological circuit is mainly a three-leg full-bridge topology which uses bipolar modulation. In this way, the switching units Q1 to Q6 is required to operate at a high frequency in a whole mains cycle, with a high switching loss and conduction loss, resulting in low overall inverter efficiency.

SUMMARY

To solve the above problems, the present disclosure provides an inverter circuit for realizing high-efficiency control of single-phase power of single-phase three-wire power supply, so as to greatly improve efficiency of a whole inverter circuit.

An inverter circuit for realizing high-efficiency control of single-phase power of a single-phase three-wire power supply includes a bridge inverter circuit connected to an output end of a DC power supply, a freewheeling circuit connected to an output end of the bridge inverter circuit for providing freewheeling during switching of the bridge inverter circuit, and a control unit connected with the bridge inverter circuit and the freewheeling circuit.

The bridge inverter circuit includes a first switch unit Q1 and a second switch unit Q2 connected to form a first arm circuit, a third switch unit Q3 and a fourth switch unit Q4 connected to form a second arm circuit, a fifth switch unit Q5 and a sixth switch unit Q6 connected to form a third arm circuit. A midpoint of the first arm circuit is connected with a U-phase line, a midpoint of the second arm circuit is connected with a N-phase line, a midpoint of the third arm circuit is connected with a W-phase line, a load R1 is connected between the U-phase line and N-phase line, and a load R2 is connected between the N-phase line and W-phase line.

The freewheeling circuit includes a seventh switching unit Q7 and an eighth switching unit Q8 connected in series and between the midpoint of the first arm circuit and the midpoint of the third arm circuit, a ninth switching unit Q9 and a tenth switching unit Q10 connected in series and between the midpoint of the second arm circuit and the midpoint of the third arm circuit, an eleventh switching unit Q11 and a twelfth switching unit Q12 connected in series and between the midpoint of the first arm circuit and the midpoint of the second arm circuit.

The control unit controls operating states of the first switching unit Q1, the second switching unit Q2, the third switching unit Q3, the fourth switching unit Q4, the fifth switching unit Q5, the sixth switching unit Q6, the seventh switching unit Q7, the eighth switching unit Q8, the ninth switching unit Q9, the tenth switching unit Q10, the eleventh switching unit Q11 and the twelfth switching unit Q12 according to the loads R1 and R2 to control output power of the U-phase line and output power of the W-phase line.

Preferably, when the load R1 is equal to the load R2, the control unit controls the output power of the U-phase line to be equal to the output power of the W-phase line.

In a positive half cycle of sine wave output by the U-phase line and the W-phase line, the control unit controls the first switching unit Q1, the sixth switching unit Q6, and one of the seventh switching unit Q7 and the eighth switching unit Q8 to be in a high-frequency switching state, and the other of the seventh switching unit Q7 and the eighth switching unit Q8 to be in a normally open state.

In a negative half cycle of sine wave output by the U-phase line and the W-phase line, the control unit controls the second switching unit Q2, the fifth switching unit Q5, and one of the seventh switching unit Q7 and the eighth switching unit Q8 to be in a high-frequency switching state, and the other of the seventh switching unit Q7 and the eighth switching unit Q8 to be in a normally open state.

Preferably, when the load R1 is greater than the load R2, the control unit controls the output power of the U-phase line to be greater than that of the W-phase line.

In a positive half cycle of sine wave output by the U-phase line and the W-phase line, the control unit controls the first switching unit Q1, the fourth switching unit Q4, the sixth switching unit Q6, one of the seventh switching unit Q7 and the eighth switching unit Q8 and one of the eleventh switching unit Q11 and the twelfth switching unit Q12 to be in a high-frequency switching state, and the other of the seventh switching unit Q7 and the eighth switching unit Q8 as well as the other of the eleventh switching unit Q11 and the twelfth switching unit Q12 to be in a normally open state.

In a negative half cycle of sine wave output by the U-phase line and the W-phase line, the control unit controls the second switching unit Q2, the third switching unit Q3, the fifth switching unit Q5, one of the seventh switching unit Q7 and the eighth switching unit Q8 and one of the eleventh switching unit Q11 and the twelfth switching unit Q12 to be in a high-frequency switching state, and the other of the seventh switching unit Q7 and the eighth switching unit Q8 as well as the other of the eleventh switching unit Q11 and the twelfth switching unit Q12 to be in a normally open state.

Preferably, when the load R1 is smaller than the load R2, the control unit controls the output power of the U-phase line to be smaller than that of the W-phase line.

In a positive half cycle of sine wave output by the U-phase line and the W-phase line, the control unit controls the first switching unit Q1, the third switching unit Q3, the sixth switching unit Q6, one of the seventh switching unit Q7 and the eighth switching unit Q8 and one of the ninth switching unit Q9 and the tenth switching unit Q10 to be in a high-frequency switching state, and the other of the seventh switching unit Q7 and the eighth switching unit Q8 as well as the other of the ninth switching unit Q9 and the tenth switching unit Q10 to be in a normally open state.

In a negative half cycle of sine wave output by the U-phase line and the W-phase line, the control unit controls the second switching unit Q2, the fourth switching unit Q4, the fifth switching unit Q5, one of the seventh switching unit Q7 and the eighth switching unit Q8 and one of the ninth switching unit Q9 and the tenth switching unit Q10 to be in a high-frequency switching state, and the other of the seventh switching unit Q7 and the eighth switching unit Q8 as well as the other of the ninth switching unit Q9 and the tenth switching unit Q10 to be in a normally open state.

Preferably, the U-phase line is also connected in series with an inductor L1 for filtering. The N-phase line is also connected in series with an inductor L2 for filtering. The W-phase line is also connected in series with an inductor L3 for filtering.

Preferably, a capacitor C2 for filtering is further connected between the U-phase line and the N-phase line. A capacitor C3 for filtering is also connected between the N-phase line and the W-phase line.

Preferably, the first switching unit Q1, the second switching unit Q2, the third switching unit Q3, the fourth switching unit Q4, the fifth switching unit Q5, the sixth switching unit Q6, the seventh switching unit Q7, the eighth switching unit Q8, the ninth switching unit Q9, the tenth switching unit Q10, the eleventh switching unit Q11 and the twelfth switching unit Q12 are all high-frequency switch transistors.

According to the disclosure, following benefits can be achieved.

1. Only one part of the switching units Q1 to Q6 are controlled to operate at a high frequency and the other part is in non-operating state in the positive half cycle of sine wave output by U-phase line and W-phase line or the negative half cycle of sine wave output by U-phase line and W-phase line. When the switching units in the high-frequency operating state are switched to an off state, the freewheeling circuit is controlled to operate continuously to output power to the U-phase line or the W-phase line, so that the switching units only participate in high-frequency operations in nearly half of the whole mains cycle, so that switching loss and conduction loss of the switching units Q1 to Q6 can be reduced by nearly half, and the efficiency of the whole inverter circuit is greatly improved.

2. During the switching of the switching units in the freewheeling circuit by the control unit, one of the seventh switching unit Q7 and the eighth switching unit Q8, one of the ninth switching unit Q9 and the tenth switching unit Q10 or one of the eleventh switching unit Q11 and the twelfth switching unit Q12 are always kept in a normally open state, thereby further reducing the switching loss and conduction loss.

BRIEF DESCRIPTION OF THE DRAWINGS

The present disclosure will be described in further detail with reference to the drawings and specific embodiments.

DETAILED DESCRIPTION

With reference to the drawings, technical solutions of the present disclosure will be further described below, but the present disclosure is not limited thereto.

In an existing single-phase three-wire inverter circuit, a bridge inverter circuit is composed of switching units Q1 to Q6. When U-phase output power and W-phase output power are subjected to unipolar modulation, the switching units Q1 to Q6 is required to operate at a high frequency in a whole mains cycle, with a high switching loss and conduction loss, resulting in low overall inverter efficiency.

A basic idea of the present disclosure is that when the U-phase output power and W-phase output power are subjected to unipolar modulation, only one part of the switching units Q1 to Q6 are controlled to operate at a high frequency and the other part is in non-operating state in the positive half cycle of sine wave output by U-phase line and W-phase line or the negative half cycle of sine wave output by U-phase line and W-phase line. When the switching units in the high-frequency operating state are switched to an off state, the freewheeling circuit is controlled to operate continuously to output power to the U-phase line or the W-phase line, so that the switching units only participate in high-frequency operations in nearly half of the whole mains cycle, so that switching loss and conduction loss of the switching units Q1 to Q6 can be reduced by nearly half, and the efficiency of the whole inverter circuit is greatly improved.

Figure 1:
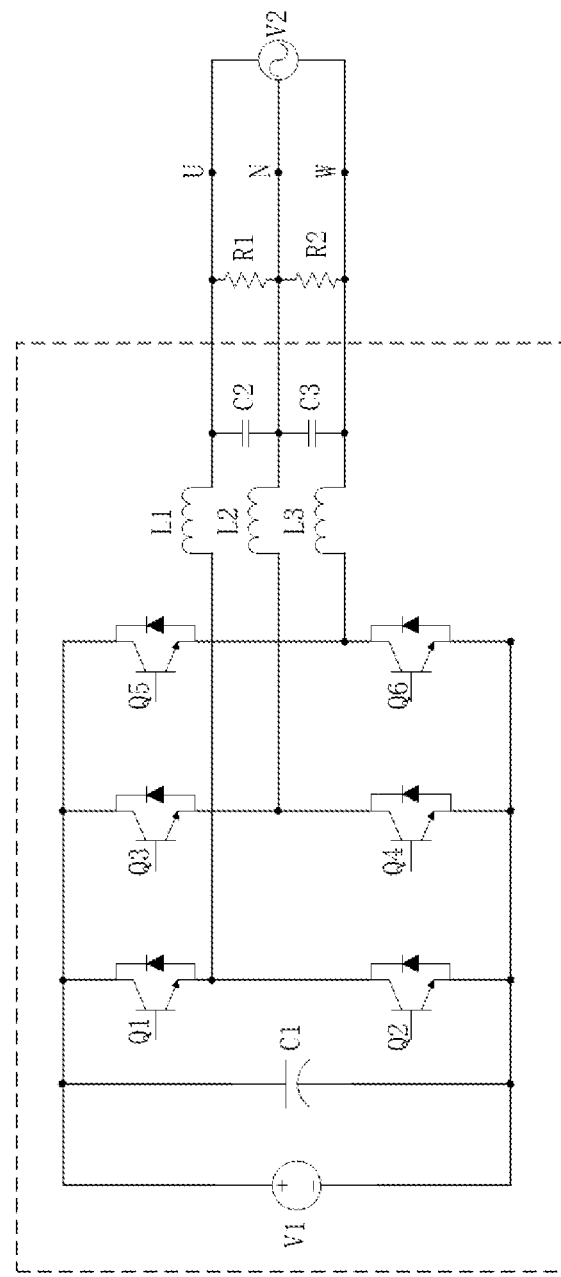
FIG. 1 is a schematic diagram of an inverter topology circuit in the prior art.
Figure 2:
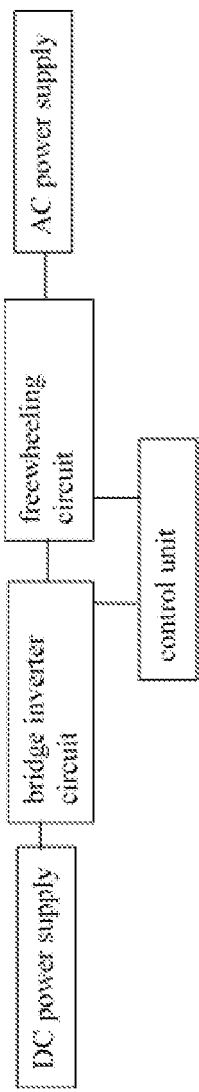
FIG. 2 is a circuit schematic of an inverter circuit for realizing high-efficiency control of single-phase power of a single-phase three-wire power supply according to an embodiment of the present disclosure.

Based on the above idea, the embodiment of the present disclosure provides an inverter circuit for realizing high-efficiency control of single-phase power of a single-phase three-wire power supply as shown in FIG. 2, which includes a bridge inverter circuit connected to an output end of a DC power supply, a freewheeling circuit connected to an output end of the bridge inverter circuit for providing freewheeling during switching of the bridge inverter circuit, and a control unit connected with the bridge inverter circuit and the freewheeling circuit. An output end of the freewheeling circuit is connected with an AC power supply.

A direct current output by the DC power supply is converted into an AC current by the switching of the bridge inverter circuit, and when the high-frequency switch transistors in the high-frequency operations are switched to the off state by the freewheeling circuit, the power is continuously output to the U-phase line or the W-phase line. The control unit sends a control signal according to the load to realize switching control of the bridge inverter circuit and the freewheeling circuit.

Figure 3:
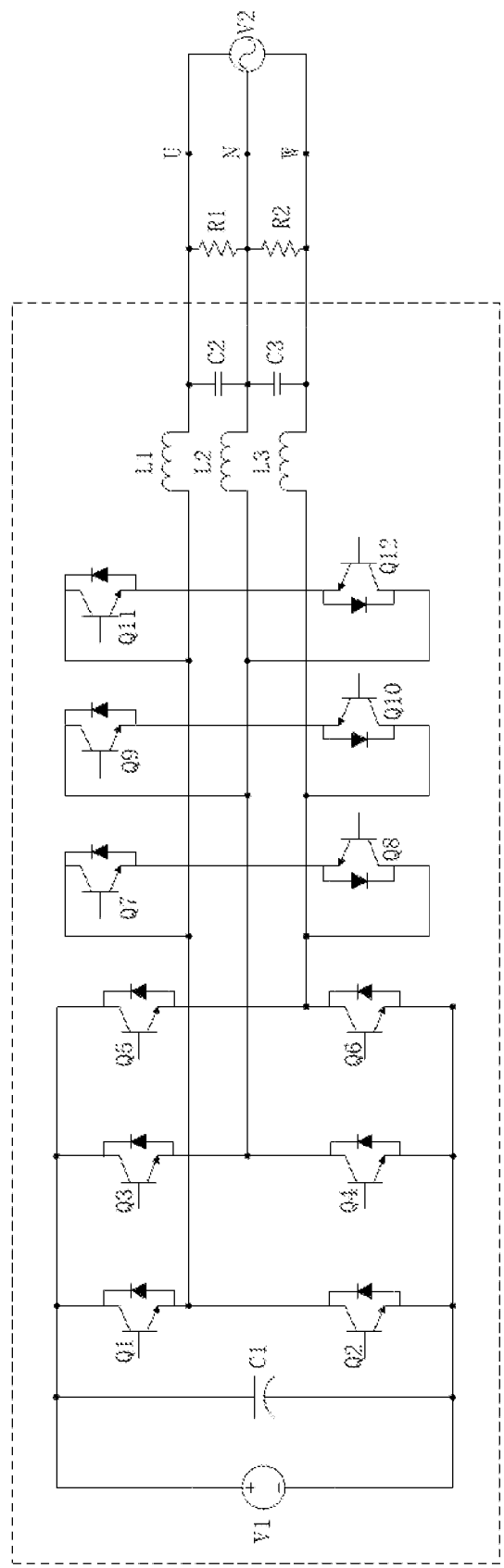
FIG. 3 is a schematic circuit diagram of an inverter circuit for realizing high-efficiency control of single-phase power of a single-phase three-wire power supply according to an embodiment of the present disclosure.

As shown in FIG. 3, the bridge inverter circuit includes a first switch unit Q1 and a second switch unit Q2 connected to form a first arm circuit, a third switch unit Q3 and a fourth switch unit Q4 connected to form a second arm circuit, a fifth switch unit Q5 and a sixth switch unit Q6 connected to form a third arm circuit. A midpoint of the first arm circuit is connected with a U-phase line, a midpoint of the second arm circuit is connected with a N-phase line, a midpoint of the third arm circuit is connected with a W-phase line, a load R1 is connected between the U-phase line and N-phase line, and a load R2 is connected between the N-phase line and W-phase line.

As shown in FIG. 3, the freewheeling circuit includes a seventh switching unit Q7 and an eighth switching unit Q8 connected in series and between the midpoint of the first arm circuit and the midpoint of the third arm circuit, a ninth switching unit Q9 and a tenth switching unit Q10 connected in series and between the midpoint of the second arm circuit and the midpoint of the third arm circuit, an eleventh switching unit Q11 and a twelfth switching unit Q12 connected in series and between the midpoint of the first arm circuit and the midpoint of the second arm circuit.

As shown in FIG. 3, C1 represents a bus capacitor, V1 represents a DC power supply, V2 represents a AC split-phase power supply, the load R1 is connected between the N-phase line and the U-phase line, and the load R2 is connected between the N-phase line and the W-phase line and connected with the AC split-phase power supply V2.

The control unit controls operating states of the first switching unit Q1, the second switching unit Q2, the third switching unit Q3, the fourth switching unit Q4, the fifth switching unit Q5, the sixth switching unit Q6, the seventh switching unit Q7, the eighth switching unit Q8, the ninth switching unit Q9, the tenth switching unit Q10, the eleventh switching unit Q11 and the twelfth switching unit Q12 to control output power of the U-phase line and output power of the W-phase line.

In an embodiment, the U-phase line is also connected in series with an inductor L1 for filtering. The N-phase line is also connected in series with an inductor L2 for filtering. The W-phase line is also connected in series with an inductor L3 for filtering.

In an embodiment, a capacitor C2 for filtering is further connected between the U-phase line and the N-phase line. A capacitor C3 for filtering is also connected between the N-phase line and the W-phase line.

The first switching unit Q1, the second switching unit Q2, the third switching unit Q3, the fourth switching unit Q4, the fifth switching unit Q5, the sixth switching unit Q6, the seventh switching unit Q7, the eighth switching unit Q8, the ninth switching unit Q9, the tenth switching unit Q10, the eleventh switching unit Q11 and the twelfth switching unit Q12 are all high-frequency switch transistors, such as IGBT or MOSFET.

The output power of the U-phase line is related to that of the W-phase line and its connected load power. When the load power increases, it is necessary to control the line corresponding to the load to increase a corresponding output power; and when the load power decreases, it is necessary to control the line corresponding to the load to reduce the corresponding output power.

In this embodiment, the control unit performs the control with PWM control technologies in a unipolar modulation method. In the unipolar modulation mode, a carrier wave changes in two directions in a half cycle, and a PWM waveform also changes in two directions.

In an embodiment, when the load R1 is equal to the load R2, the control unit controls the output power of the U-phase line to be equal to the output power of the W-phase line.

In a positive half cycle of sine wave output by the U-phase line and the W-phase line, the control unit controls the first switching unit Q1, the sixth switching unit Q6, and one of the seventh switching unit Q7 and the eighth switching unit Q8 to be in a high-frequency switching state, and the other of the seventh switching unit Q7 and the eighth switching unit Q8 to be in a normally open state, while the other switching units are in a non-operating state.

Figure 4:
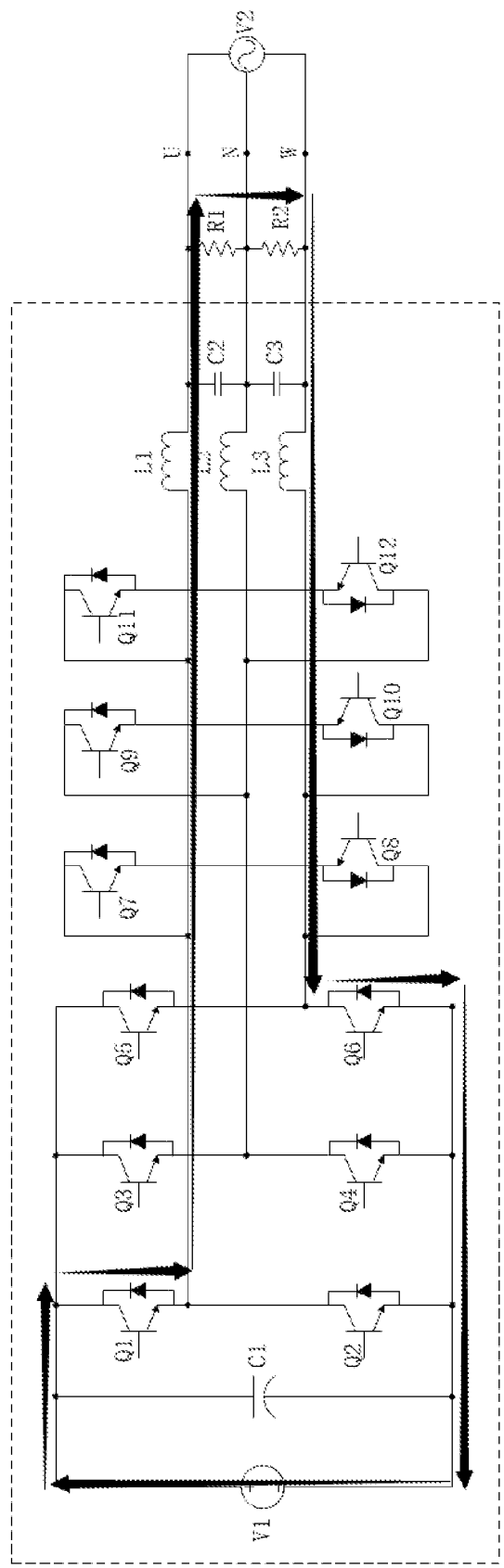
FIG. 4 is a schematic diagram of power flowing of a first topology of an inverter circuit for realizing high-efficiency control of single-phase power of a single-phase three-wire power supply according to an embodiment of the present disclosure.

When the first switching unit Q1 and the sixth switching unit Q6 are turned on, power flowing of the topology is shown in FIG. 4, and the operating states of all switching units are shown in the following table:

| positive half cycle of sine | 1 | 2 | 3 | 4 | 5 | 6 | 7 | 8 | 9 | 10 | 11 | 12 |
|---|---|---|---|---|---|---|---|---|---|---|---|---|
| | n | ff | ff | ff | ff | n | ff | n | ff | ff | ff | ff |

Figure 5:
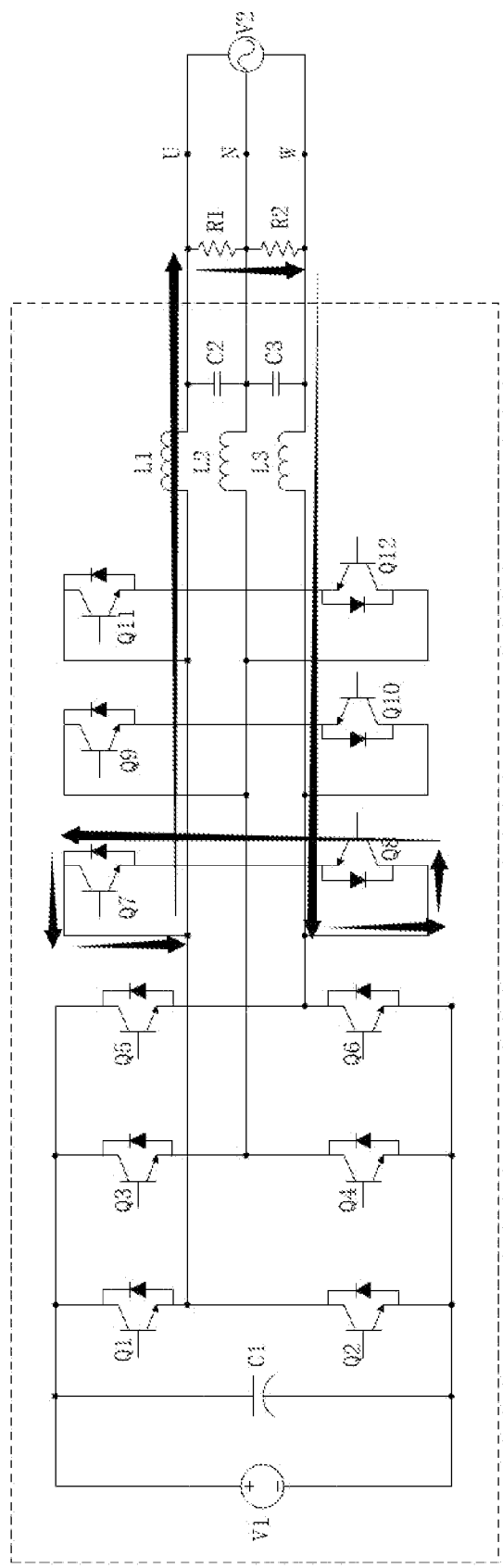
FIG. 5 is a schematic diagram of power flowing of a second topology of an inverter circuit for realizing high-efficiency control of single-phase power of a single-phase three-wire power supply according to an embodiment of the present disclosure.

When the first switching unit Q1 and the sixth switching unit Q6 are turned off, the power flowing of the topology is shown in FIG. 5, and the operating states of all switching units are shown in the following table:

| positive half cycle of sine | 1 | 2 | 3 | 4 | 5 | 6 | 7 | 8 | 9 | 10 | 11 | 12 |
|---|---|---|---|---|---|---|---|---|---|---|---|---|
| | ff | ff | ff | ff | ff | ff | n | n | ff | ff | ff | ff |

In a negative half cycle of sine wave output by the U-phase line and the W-phase line, the control unit controls the second switching unit Q2, the fifth switching unit Q5, and one of the seventh switching unit Q7 and the eighth switching unit Q8 to be in a high-frequency switching state, and the other of the seventh switching unit Q7 and the eighth switching unit Q8 to be in a normally open state, while the other switching units are in a non-operating state, while the other switching units are in a non-operating state.

Figure 6:
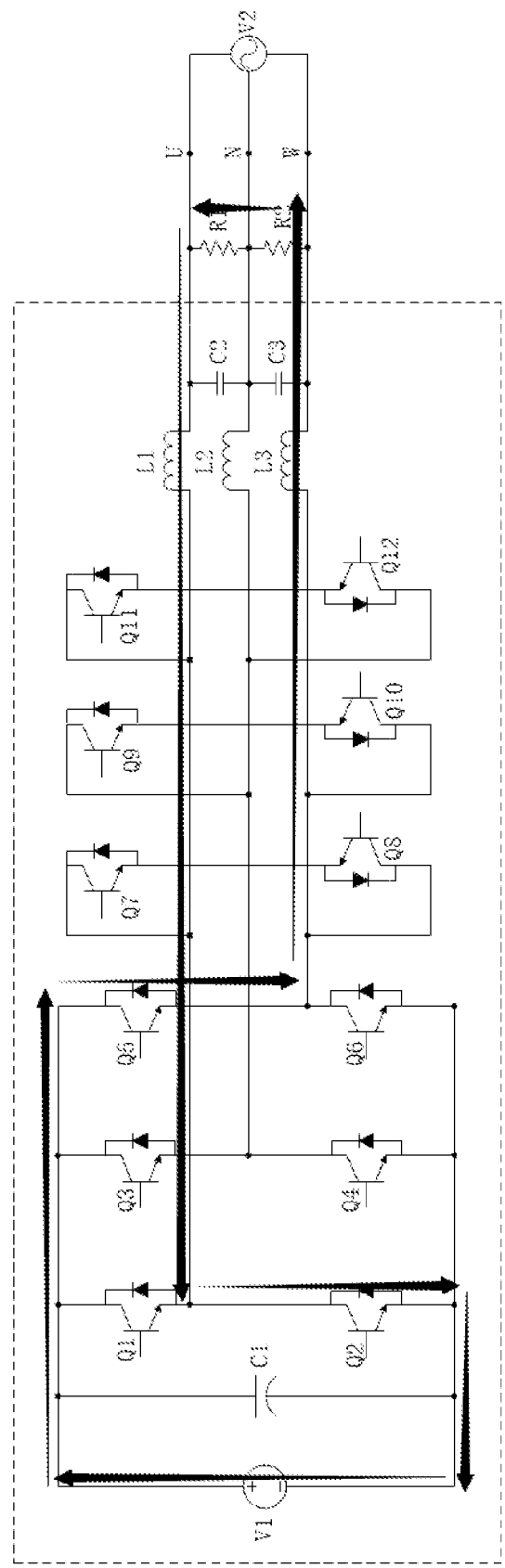
FIG. 6 is a schematic diagram of power flowing of a third topology of an inverter circuit for realizing high-efficiency control of single-phase power of a single-phase three-wire power supply according to an embodiment of the present disclosure.

When the second switching unit Q2 and the fifth switching unit Q5 are turned on, the power flowing of the topology is shown in FIG. 6, and the operating states of all switching units are shown in the following table:

| negative half cycle of sine | 1 | 2 | 3 | 4 | 5 | 6 | 7 | 8 | 9 | 10 | 11 | 12 |
|---|---|---|---|---|---|---|---|---|---|---|---|---|
| | ff | n | ff | ff | n | ff | n | ff | ff | ff | ff | ff |

Figure 7:
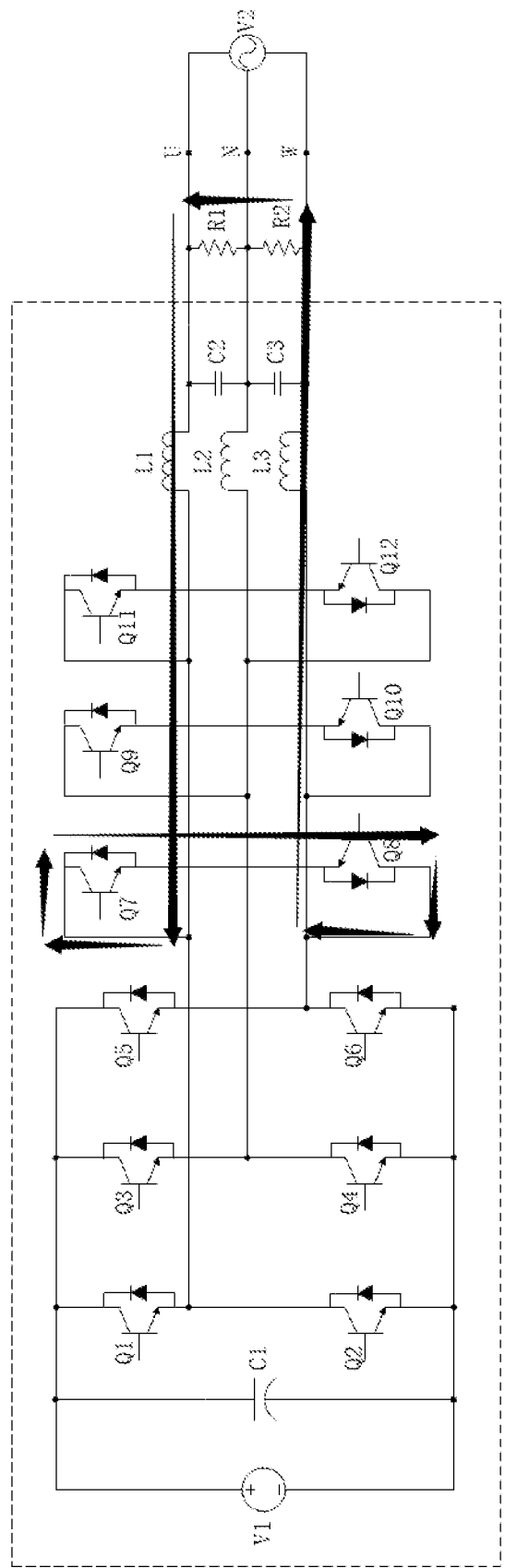
FIG. 7 is a schematic diagram of power flowing of a fourth topology of an inverter circuit for realizing high-efficiency control of single-phase power of a single-phase three-wire power supply according to an embodiment of the present disclosure.

When the second switching unit Q2 and the fifth switching unit Q5 are turned off, the power flowing of the topology is shown in FIG. 7, and the operating states of all switching units are shown in the following table:

| negative half cycle of sine | 1 | 2 | 3 | 4 | 5 | 6 | 7 | 8 | 9 | 10 | 11 | 12 |
|---|---|---|---|---|---|---|---|---|---|---|---|---|
| | ff | ff | ff | ff | ff | ff | n | n | ff | ff | ff | ff |

It can be seen from FIG. 4 to FIG. 7 that when the load R1 is equal to the load R2, the switching control of the switching unit is made by the control unit so that the output power of the U-phase line is equal to the output power of the W-phase line, and finally the U-phase output power is equal to load R1 power and the W-phase output power is equal to load R2 power, so as to realize zero power export and zero power consumption of the power grid.

In an embodiment, when the load R1 is greater than the load R2, the control unit controls the output power of the U-phase line to be greater than that of the W-phase line.

In a positive half cycle of sine wave output by the U-phase line and the W-phase line, the control unit controls the first switching unit Q1, the fourth switching unit Q4, the sixth switching unit Q6, one of the seventh switching unit Q7 and the eighth switching unit Q8 and one of the eleventh switching unit Q11 and the twelfth switching unit Q12 to be in a high-frequency switching state, and the other of the seventh switching unit Q7 and the eighth switching unit Q8 as well as the other of the eleventh switching unit Q11 and the twelfth switching unit Q12 to be in a normally open state, while the other switching units are in a non-operating state.

Figure 8:
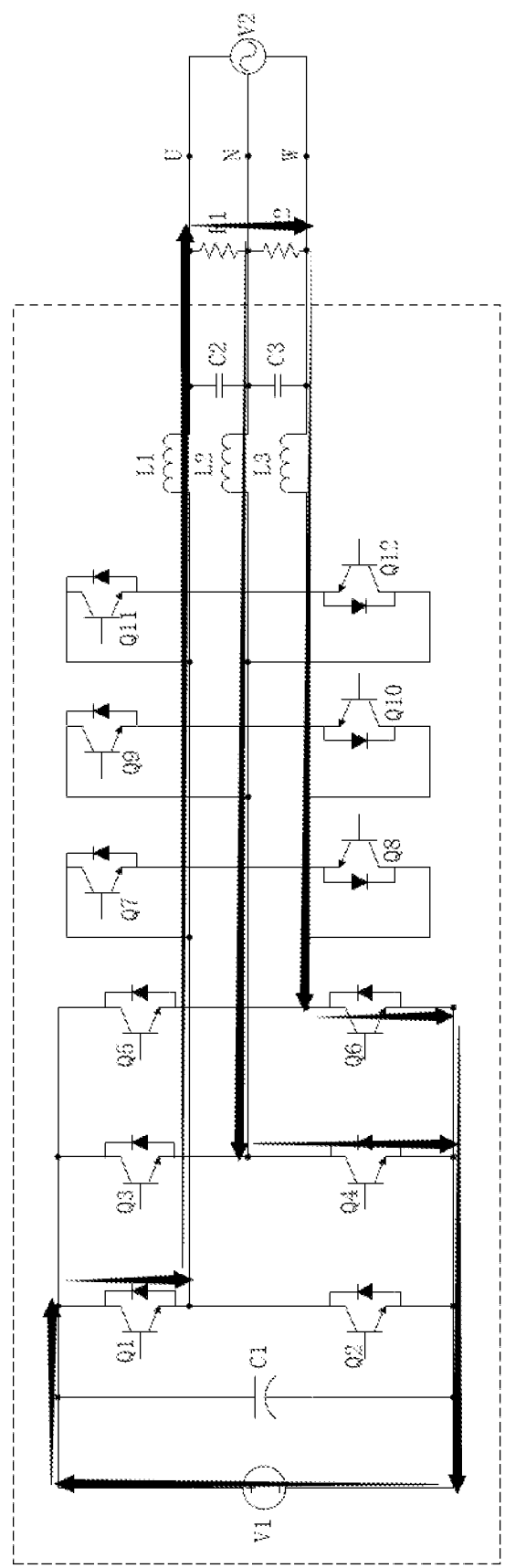
FIG. 8 is a schematic diagram of power flowing of a fifth topology of an inverter circuit for realizing high-efficiency control of single-phase power of a single-phase three-wire power supply according to an embodiment of the present disclosure.

When the first switching unit Q1, the fourth switching unit Q4 and the sixth switching unit Q6 are turned on, power flowing of the topology is shown in FIG. 8, and the operating states of all switching units are shown in the following table:

| positive half cycle of sine | 1 | 2 | 3 | 4 | 5 | 6 | 7 | 8 | 9 | 10 | 11 | 12 |
|---|---|---|---|---|---|---|---|---|---|---|---|---|
| | n | ff | ff | n | ff | n | ff | n | ff | ff | ff | n |

Figure 9:
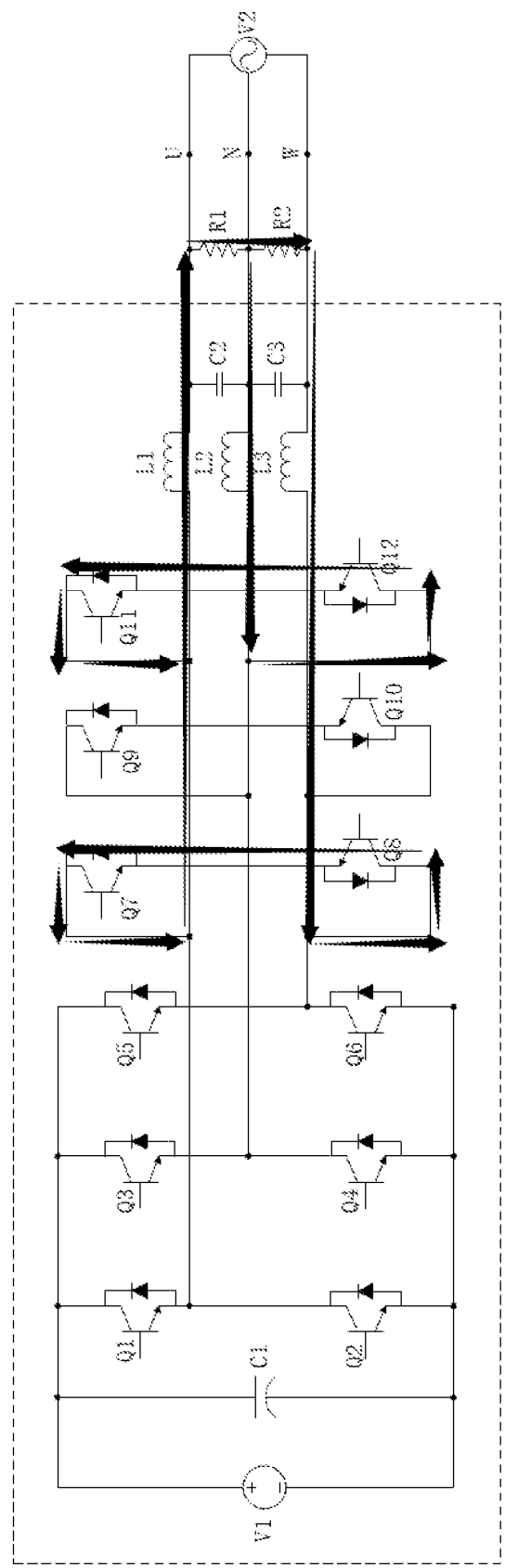
FIG. 9 is a schematic diagram of power flowing of a sixth topology of an inverter circuit for realizing high-efficiency control of single-phase power of a single-phase three-wire power supply according to an embodiment of the present disclosure.

When the first switching unit Q1, the fourth switching unit Q4 and the sixth switching unit Q6 are turned off, the power flowing of the topology is shown in FIG. 9, and the operating states of all switching units are shown in the following table:

| positive half cycle of sine | 1 | 2 | 3 | 4 | 5 | 6 | 7 | 8 | 9 | 10 | 11 | 12 |
|---|---|---|---|---|---|---|---|---|---|---|---|---|
| | ff | ff | ff | ff | ff | ff | n | n | ff | ff | n | n |

In a negative half cycle of sine wave output by the U-phase line and the W-phase line, the control unit controls the second switching unit Q2, the third switching unit Q3, the fifth switching unit Q5, one of the seventh switching unit Q7 and the eighth switching unit Q8 and one of the eleventh switching unit Q11 and the twelfth switching unit Q12 to be in a high-frequency switching state, and the other of the seventh switching unit Q7 and the eighth switching unit Q8 as well as the other of the eleventh switching unit Q11 and the twelfth switching unit Q12 to be in a normally open state, while the other switching units are in a non-operating state.

Figure 10:
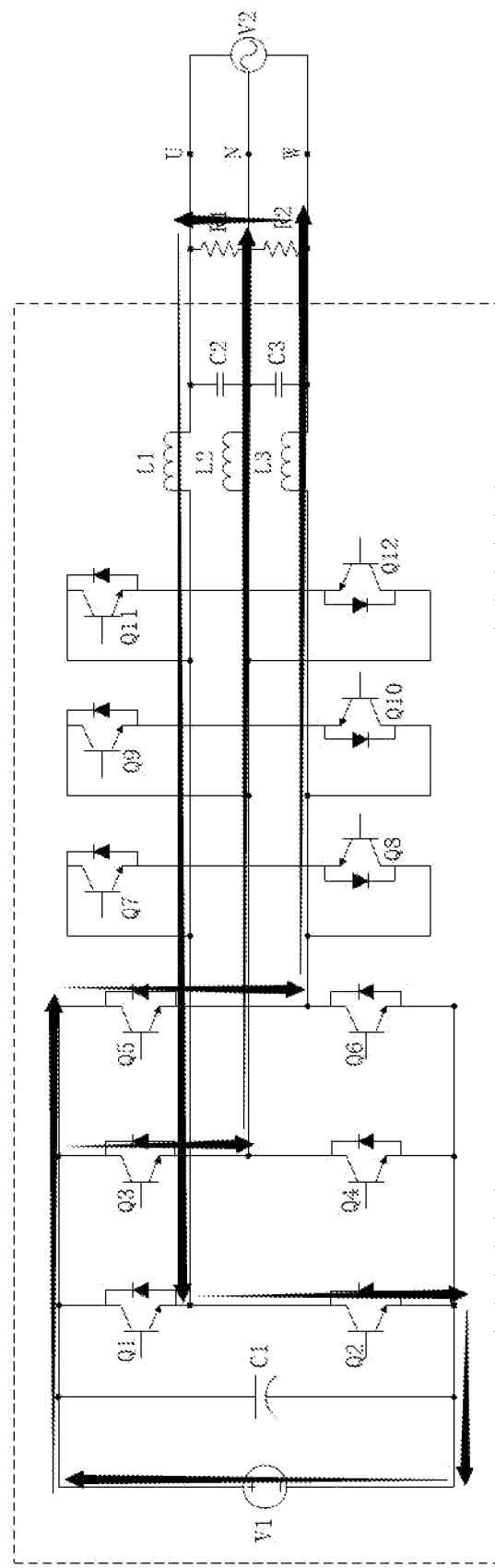
FIG. 10 is a schematic diagram of power flowing of a seventh topology of an inverter circuit for realizing high-efficiency control of single-phase power of a single-phase three-wire power supply according to an embodiment of the present disclosure.

When the second switching unit Q2, the third switching unit Q3 and the fifth switching unit Q5 are turned on, power flowing of the topology is shown in FIG. 10, and the operating states of all switching units are shown in the following table:

| negative half cycle of sine | 1 | 2 | 3 | 4 | 5 | 6 | 7 | 8 | 9 | 10 | 11 | 12 |
|---|---|---|---|---|---|---|---|---|---|---|---|---|
| | ff | n | n | ff | n | ff | n | ff | ff | ff | n | ff |

Figure 11:
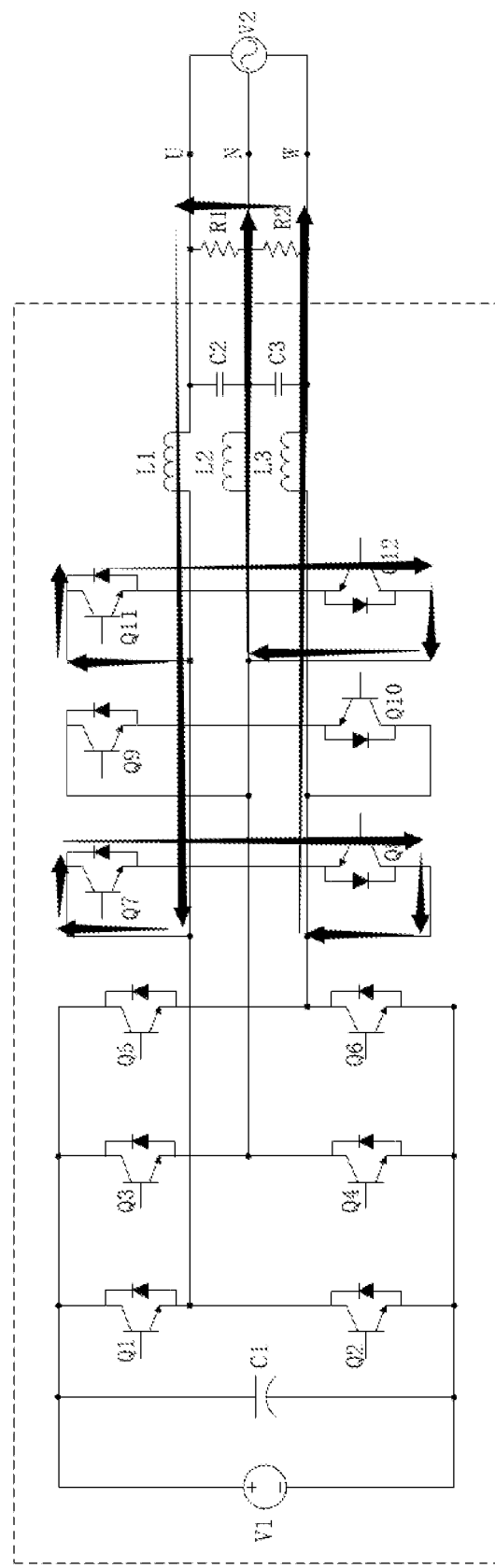
FIG. 11 is a schematic diagram of power flowing of an eighth topology of an inverter circuit for realizing high-efficiency control of single-phase power of a single-phase three-wire power supply according to an embodiment of the present disclosure.

When the second switching unit Q2, the third switching unit Q3 and the fifth switching unit Q5 are turned off, the power flowing of the topology is shown in FIG. 11, and the operating states of all switching units are shown in the following table:

| negative half cycle of sine | 1 | 2 | 3 | 4 | 5 | 6 | 7 | 8 | 9 | 10 | 11 | 12 |
|---|---|---|---|---|---|---|---|---|---|---|---|---|
| | ff | ff | ff | ff | ff | ff | n | n | ff | ff | n | n |

It can be seen from FIG. 8 to FIG. 11 that when the load R1 is greater than the load R2, the switching control of the switching unit is made by the control unit so that the output power of the U-phase line is greater than the output power of the W-phase line, and finally the U-phase output power is equal to load R1 power and the W-phase output power is equal to load R2 power, so as to realize zero power export and zero power consumption of the power grid.

In an embodiment, when the load R1 is smaller than the load R2, the control unit controls the output power of the U-phase line to be smaller than that of the W-phase line.

In a positive half cycle of sine wave output by the U-phase line and the W-phase line, the control unit controls the first switching unit Q1, the third switching unit Q3, the sixth switching unit Q6, one of the seventh switching unit Q7 and the eighth switching unit Q8 and one of the ninth switching unit Q9 and the tenth switching unit Q10 to be in a high-frequency switching state, and the other of the seventh switching unit Q7 and the eighth switching unit Q8 as well as the other of the ninth switching unit Q9 and the tenth switching unit Q10 to be in a normally open state, while the other switching units are in a non-operating state.

Figure 12:
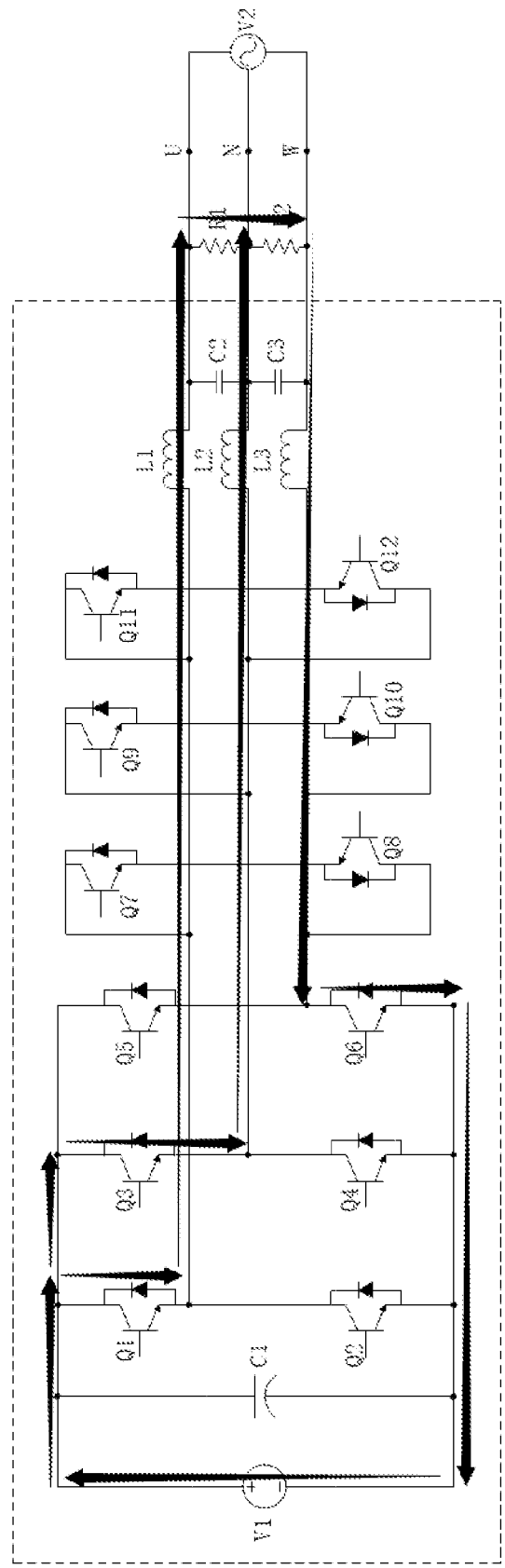
FIG. 12 is a schematic diagram of power flowing of a ninth topology of an inverter circuit for realizing high-efficiency control of single-phase power of a single-phase three-wire power supply according to an embodiment of the present disclosure.

When the first switching unit Q1, the third switching unit Q3 and the sixth switching unit Q6 are turned on, power flowing of the topology is shown in FIG. 12, and the operating states of all switching units are shown in the following table:

| positive half cycle of sine | 1 | 2 | 3 | 4 | 5 | 6 | 7 | 8 | 9 | 10 | 11 | 12 |
|---|---|---|---|---|---|---|---|---|---|---|---|---|
| | n | ff | n | ff | ff | n | ff | n | ff | n | ff | ff |

Figure 13:
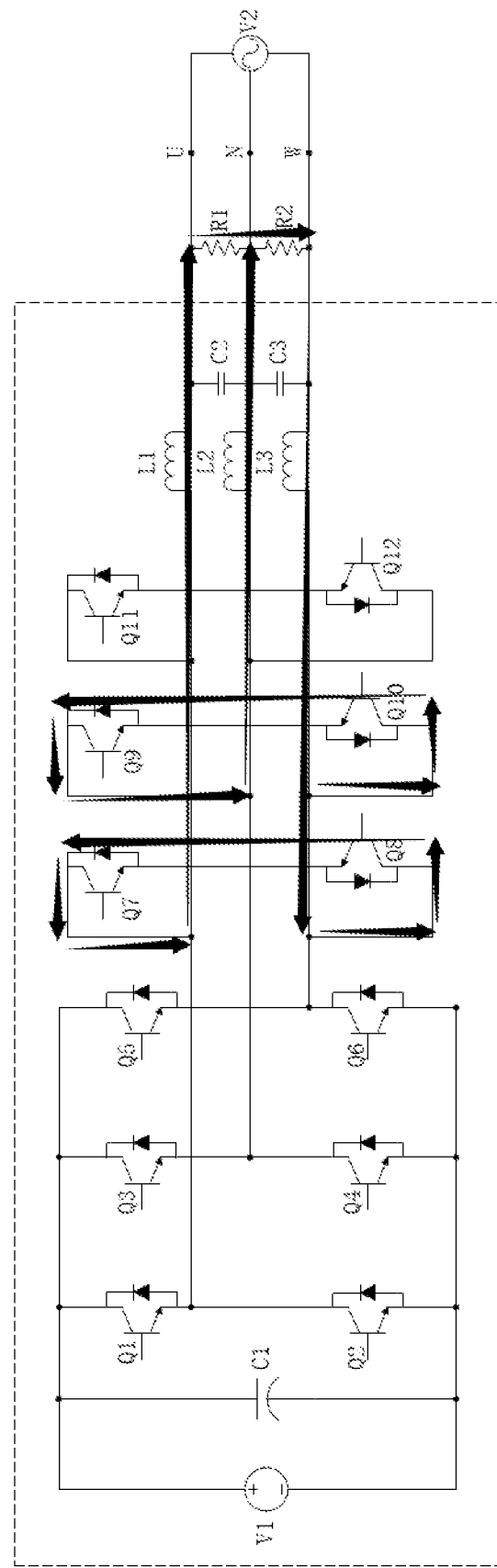
FIG. 13 is a schematic diagram of power flowing of a tenth topology of an inverter circuit for realizing high-efficiency control of single-phase power of a single-phase three-wire power supply according to an embodiment of the present disclosure.

When the first switching unit Q1, the third switching unit Q3 and the sixth switching unit Q6 are turned off, power flowing of the topology is shown in FIG. 13, and the operating states of all switching units are shown in the following table:

| positive half cycle of sine | 1 | 2 | 3 | 4 | 5 | 6 | 7 8 | 9 10 | 11 | 12 |
|---|---|---|---|---|---|---|---|---|---|---|
| | ff | ff | ff | ff | ff | ff | n n | n n | ff | ff |

In a negative half cycle of sine wave output by the U-phase line and the W-phase line, the control unit controls the second switching unit Q2, the fourth switching unit Q4, the fifth switching unit Q5, one of the seventh switching unit Q7 and the eighth switching unit Q8 and one of the ninth switching unit Q9 and the tenth switching unit Q10 to be in a high-frequency switching state, and the other of the seventh switching unit Q7 and the eighth switching unit Q8 as well as the other of the ninth switching unit Q9 and the tenth switching unit Q10 to be in a normally open state, while the other switching units are in a non-operating state.

Figure 14:
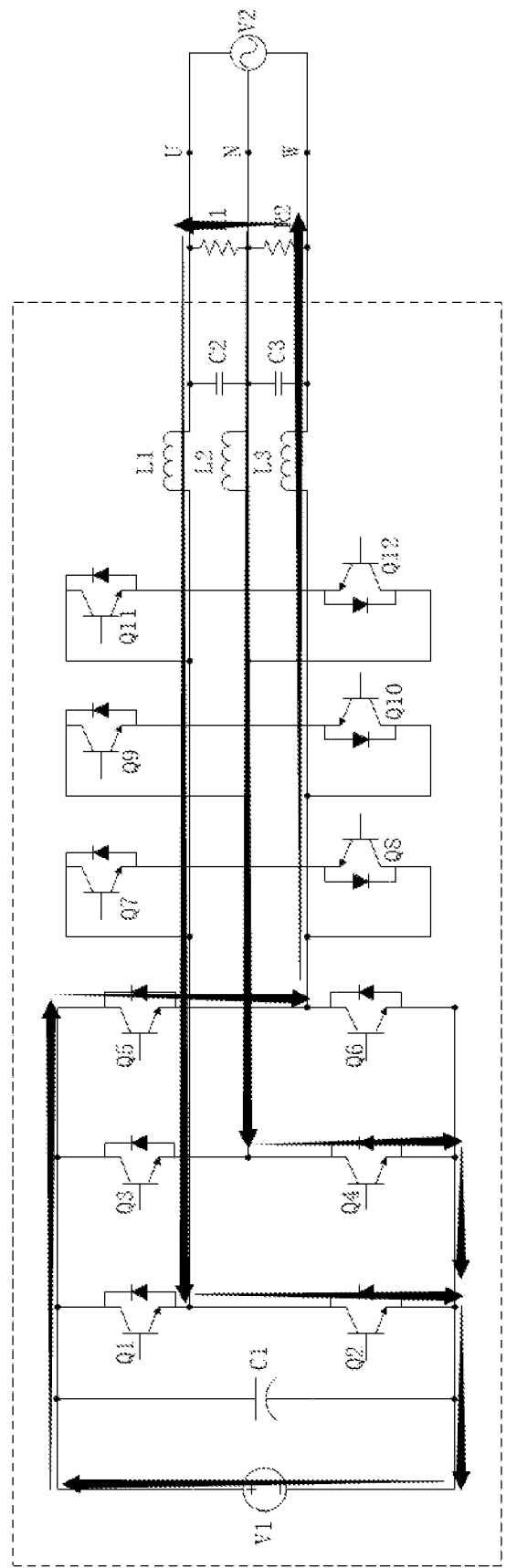
FIG. 14 is a schematic diagram of power flowing of a eleventh topology of an inverter circuit for realizing high-efficiency control of single-phase power of a single-phase three-wire power supply according to an embodiment of the present disclosure.

When the second switching unit Q2, the fourth switching unit Q4 and the fifth switching unit Q5 are turned on, power flowing of the topology is shown in FIG. 14, and the operating states of all switching units are shown in the following table:

| negative half cycle of sine | 1 | 2 | 3 | 4 | 5 | 6 | 7 | 8 | 9 | 10 | 11 | 12 |
|---|---|---|---|---|---|---|---|---|---|---|---|---|
| | ff | n | ff | n | n | ff | n | ff | n | ff | ff | ff |

Figure 15:
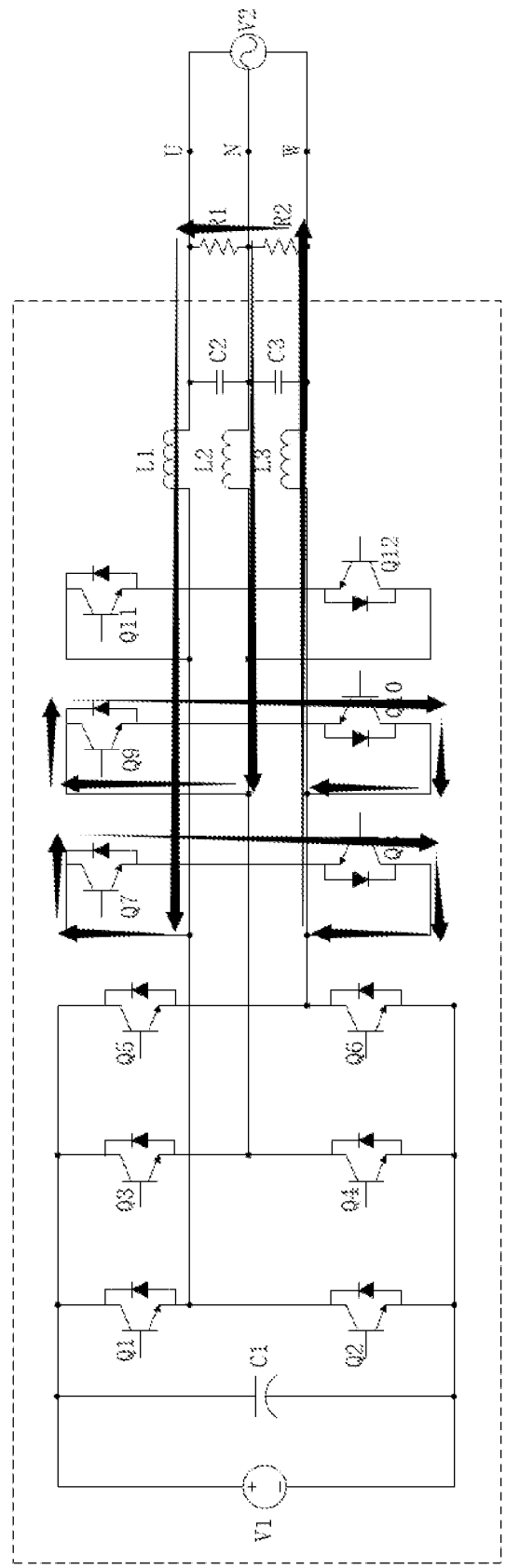
FIG. 15 is a schematic diagram of power flowing of a twelfth topology of an inverter circuit for realizing high-efficiency control of single-phase power of a single-phase three-wire power supply according to an embodiment of the present disclosure.

When the second switching unit Q2, the fourth switching unit Q4 and the fifth switching unit Q5 are turned off, power flowing of the topology is shown in FIG. 15.

The operating states of all switching units are shown in the following table:

| negative half cycle of sine | 1 | 2 | 3 | 4 | 5 | 6 | 7 8 | 9 10 | 11 | 12 |
|---|---|---|---|---|---|---|---|---|---|---|
| | ff | ff | ff | ff | ff | ff | n n | n n | ff | ff |

It can be seen from FIG. 12 to FIG. 15 that when the load R1 is smaller than the load R2, the switching control of the switching unit is made by the control unit so that the output power of the U-phase line is smaller than the output power of the W-phase line, and finally the U-phase output power is equal to load R1 power and the W-phase output power is equal to load R2 power, so as to realize zero power export and zero power consumption of the power grid.

It should be noted that During the switching of the switching units in the freewheeling circuit by the control unit, one of the seventh switching unit Q7 and the eighth switching unit Q8, one of the ninth switching unit Q9 and the tenth switching unit Q10 or one of the eleventh switching unit Q11 and the twelfth switching unit Q12 are always kept in a normally open state, thereby further reducing the switching loss and conduction loss.

Various modifications, supplements or similar replacements can be made to the described specific embodiments by those skilled in the art to which the present disclosure pertains, without departing from the spirit of the present disclosure or beyond the scope defined in the claims.

What is claimed is:

1. An inverter circuit for realizing high-efficiency control of single-phase power of a single-phase three-wire power supply, comprising a bridge inverter circuit connected to an output end of a DC power supply, a freewheeling circuit connected to an output end of the bridge inverter circuit for providing freewheeling during switching of the bridge inverter circuit, and a control unit connected with the bridge inverter circuit and the freewheeling circuit;

wherein the bridge inverter circuit comprises a first switch unit and a second switch unit connected to form a first arm circuit, a third switch unit and a fourth switch unit connected to form a second arm circuit, a fifth switch unit and a sixth switch unit connected to form a third arm circuit, a midpoint of the first arm circuit is connected with a U-phase line, a midpoint of the second arm circuit is connected with a N-phase line, a midpoint of the third arm circuit is connected with a W-phase line, a first load is connected between the U-phase line and the N-phase line, and a second load is connected between the N-phase line and the W-phase line;

the freewheeling circuit comprises a seventh switching unit and an eighth switching unit connected in series and directly connected between the midpoint of the first arm circuit and the midpoint of the third arm circuit, a ninth switching unit and a tenth switching unit connected in series and directly connected between the midpoint of the second arm circuit and the midpoint of the third arm circuit, an eleventh switching unit and a twelfth switching unit connected in series and directly connected between the midpoint of the first arm circuit and the midpoint of the second arm circuit; and the control unit controls operating states of the first switching unit, the second switching unit, the third switching unit, the fourth switching unit, the fifth switching unit, the sixth switching unit, the seventh switching unit, the eighth switching unit, the ninth switching unit, the tenth switching unit, the eleventh switching unit and the twelfth switching unit according to the first load and the second load to control an output power of the U-phase line and an output power of the W-phase line;

wherein when the first load is equal to the second load, the control unit controls the output power of the U-phase line to be equal to the output power of the W-phase line, in a positive half cycle of sine wave output by the U-phase line and the W-phase line, the control unit controls the first switching unit, the sixth switching unit, one of the seventh switching unit and the eighth switching unit to be in a high-frequency switching state, and controls the other of the seventh switching unit and the eighth switching unit to be in a normally open state; in a negative half cycle of sine waves output by the U-phase line and the W-phase line, the control unit controls the second switching unit, the fifth switching unit, one of the seventh switching unit and the eighth switching unit to be in a high-frequency switching state, and controls the other of the seventh switching unit and the eighth switching unit to be in a normally open state.

2. The inverter circuit for realizing high-efficiency control of single-phase power of the single-phase three-wire power supply according to claim 1, wherein the U-phase line is connected in series with a first inductor for filtering, the N-phase line is connected in series with a second inductor for filtering, and the W-phase line is connected in series with a third inductor for filtering.

3. The inverter circuit for realizing high-efficiency control of single-phase power of the single-phase three-wire power supply according to claim 1, wherein a first capacitor for filtering is connected between the U-phase line and the N-phase line, and a second capacitor for filtering is connected between the N-phase line and the W-phase line.

4. The inverter circuit for realizing high-efficiency control of single-phase power of the single-phase three-wire power supply according to claim 1, wherein the first switching unit, the second switching unit, the third switching unit, the fourth switching unit, the fifth switching unit, the sixth switching unit, the seventh switching unit, the eighth switching unit, the ninth switching unit, the tenth switching unit, the eleventh switching unit and the twelfth switching unit are all high-frequency switch transistors.

5. An inverter circuit for realizing high-efficiency control of single-phase power of a single-phase three-wire power supply, comprising a bridge inverter circuit connected to an output end of a DC power supply, a freewheeling circuit connected to an output end of the bridge inverter circuit for providing freewheeling during switching of the bridge inverter circuit, and a control unit connected with the bridge inverter circuit and the freewheeling circuit;

wherein the bridge inverter circuit comprises a first switch unit and a second switch unit connected to form a first arm circuit, a third switch unit and a fourth switch unit connected to form a second arm circuit, a fifth switch unit and a sixth switch unit connected to form a third arm circuit, a midpoint of the first arm circuit is connected with a U-phase line, a midpoint of the second arm circuit is connected with a N-phase line, a midpoint of the third arm circuit is connected with a W-phase line, a first load is connected between the U-phase line and the N-phase line, and a second load is connected between the N-phase line and the W-phase line;

the freewheeling circuit comprises a seventh switching unit and an eighth switching unit connected in series and directly connected between the midpoint of the first arm circuit and the midpoint of the third arm circuit, a ninth switching unit and a tenth switching unit connected in series and directly connected between the midpoint of the second arm circuit and the midpoint of the third arm circuit, an eleventh switching unit and a twelfth switching unit connected in series and directly connected between the midpoint of the first arm circuit and the midpoint of the second arm circuit; and the control unit controls operating states of the first switching unit, the second switching unit, the third switching unit, the fourth switching unit, the fifth switching unit, the sixth switching unit, the seventh switching unit, the eighth switching unit, the ninth switching unit, the tenth switching unit, the eleventh switching unit and the twelfth switching unit according to the first load and the second load to control an output power of the U-phase line and an output power of the W-phase line;

wherein when the first load is greater than the second load, the control unit controls the output power of the U-phase line to be greater than the output power of the W-phase line, in a positive half cycle of sine wave output by the U-phase line and the W-phase line, the control unit controls the first switching unit, the fourth switching unit, the sixth switching unit, one of the seventh switching unit and the eighth switching unit and one of the eleventh switching unit and the twelfth switching unit to be in a high-frequency switching state, and the other of the seventh switching unit and the eighth switching unit as well as the other of the eleventh switching unit and the twelfth switching unit to be in a normally open state;

in a negative half cycle of sine wave output by the U-phase line and the W-phase line, the control unit controls the second switching unit, the third switching unit, the fifth switching unit, one of the seventh switching unit and the eighth switching unit and one of the eleventh switching unit and the twelfth switching unit to be in a high-frequency switching state, and the other of the seventh switching unit and the eighth switching unit as well as the other of the eleventh switching unit and the twelfth switching unit to be in a normally open state.

6. The inverter circuit for realizing high-efficiency control of single-phase power of the single-phase three-wire power supply according to claim 5, wherein the U-phase line is connected in series with a first inductor for filtering, the N-phase line is connected in series with a second inductor for filtering, and the W-phase line is connected in series with a third inductor for filtering.

7. The inverter circuit for realizing high-efficiency control of single-phase power of the single-phase three-wire power supply according to claim 5, wherein a first capacitor for filtering is connected between the U-phase line and the N-phase line, and a second capacitor for filtering is connected between the N-phase line and the W-phase line.

8. The inverter circuit for realizing high-efficiency control of single-phase power of the single-phase three-wire power supply according to claim 5, wherein the first switching unit, the second switching unit, the third switching unit, the fourth switching unit, the fifth switching unit, the sixth switching unit, the seventh switching unit, the eighth switching unit, the ninth switching unit, the tenth switching unit, the eleventh switching unit and the twelfth switching unit are all high-frequency switch transistors.

9. An inverter circuit for realizing high-efficiency control of single-phase power of a single-phase three-wire power supply, comprising a bridge inverter circuit connected to an output end of a DC power supply, a freewheeling circuit connected to an output end of the bridge inverter circuit for providing freewheeling during switching of the bridge inverter circuit, and a control unit connected with the bridge inverter circuit and the freewheeling circuit;

wherein the bridge inverter circuit comprises a first switch unit and a second switch unit connected to form a first arm circuit, a third switch unit and a fourth switch unit connected to form a second arm circuit, a fifth switch unit and a sixth switch unit connected to form a third arm circuit, a midpoint of the first arm circuit is connected with a U-phase line, a midpoint of the second arm circuit is connected with a N-phase line, a midpoint of the third arm circuit is connected with a W-phase line, a first load is connected between the U-phase line and the N-phase line, and a second load is connected between the N-phase line and the W-phase line;

the freewheeling circuit comprises a seventh switching unit and an eighth switching unit connected in series and directly connected between the midpoint of the first arm circuit and the midpoint of the third arm circuit, a ninth switching unit and a tenth switching unit connected in series and directly connected between the midpoint of the second arm circuit and the midpoint of the third arm circuit, an eleventh switching unit and a twelfth switching unit connected in series and directly connected between the midpoint of the first arm circuit and the midpoint of the second arm circuit; and the control unit controls operating states of the first switching unit, the second switching unit, the third switching unit, the fourth switching unit, the fifth switching unit, the sixth switching unit, the seventh switching unit, the eighth switching unit, the ninth switching unit, the tenth switching unit, the eleventh switching unit and the twelfth switching unit according to the first load and the second load to control an output power of the U-phase line and an output power of the W-phase line;

wherein when the first load is smaller than the second load, the control unit controls the output power of the U-phase line to be smaller than the output power of the W-phase line, in a positive half cycle of sine wave output by the U-phase line and the W-phase line, the control unit controls the first switching unit, the third switching unit, the sixth switching unit, one of the seventh switching unit and the eighth switching unit and one of the ninth switching unit and the tenth switching unit to be in a high-frequency switching state, and the other of the seventh switching unit and the eighth switching unit as well as the other of the ninth switching unit and the tenth switching unit to be in a normally open state;

in a negative half cycle of sine wave output by the U-phase line and the W-phase line, the control unit controls the second switching unit, the forth switching unit, the fifth switching unit, one of the seventh switching unit and the eighth switching unit and one of the ninth switching unit and the tenth switching unit to be in a high-frequency switching state, and the other of the seventh switching unit and the eighth switching unit as well as the other of the ninth switching unit and the tenth switching unit to be in a normally open state.

10. The inverter circuit for realizing high-efficiency control of single-phase power of the single-phase three-wire power supply according to claim 9, wherein the U-phase line is connected in series with a first inductor for filtering, the N-phase line is connected in series with a second inductor for filtering, and the W-phase line is connected in series with a third inductor for filtering.

11. The inverter circuit for realizing high-efficiency control of single-phase power of the single-phase three-wire power supply according to claim 9, wherein a first capacitor for filtering is connected between the U-phase line and the N-phase line, and a second capacitor for filtering is connected between the N-phase line and the W-phase line.

12. The inverter circuit for realizing high-efficiency control of single-phase power of the single-phase three-wire power supply according to claim 9, wherein the first switching unit, the second switching unit, the third switching unit, the fourth switching unit, the fifth switching unit, the sixth switching unit, the seventh switching unit, the eighth switching unit, the ninth switching unit, the tenth switching unit, the eleventh switching unit and the twelfth switching unit are all high-frequency switch transistors.

\* \* \* \* \*